US008159696B2

(12) United States Patent
Eom et al.

(10) Patent No.: US 8,159,696 B2
(45) Date of Patent: Apr. 17, 2012

(54) IMAGE FORMING DEVICE CAPABLE OF DRIVING WITH SINGLE PROCESSOR

(75) Inventors: Yoon-seop Eom, Suwon (KR); Seung-deong An, Yongin (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1035 days.

(21) Appl. No.: 10/623,586

(22) Filed: Jul. 22, 2003

(65) Prior Publication Data

US 2004/0125386 A1 Jul. 1, 2004

(30) Foreign Application Priority Data

Jul. 22, 2002 (KR) ................................ 2002-43017
Jun. 24, 2003 (KR) ........................ 10-2003-0041252

(51) Int. Cl.
*G06F 3/12* (2006.01)
*G03G 15/00* (2006.01)

(52) U.S. Cl. .......... 358/1.15; 358/1.1; 399/107; 399/38; 347/235; 347/111

(58) Field of Classification Search ................. 358/1.15, 358/409, 410, 539, 1.1; 347/235, 111; 399/38, 399/107
See application file for complete search history.

(56) References Cited

U.S. PATENT DOCUMENTS

| | | | | |
|---|---|---|---|---|
| 5,737,602 | A * | 4/1998 | Lee | 358/1.5 |
| 5,872,635 | A * | 2/1999 | Akiyama | 358/296 |
| 6,433,811 | B1 * | 8/2002 | Kim | 347/251 |
| 6,826,376 | B2 * | 11/2004 | An et al. | 399/75 |
| 7,173,719 | B2 * | 2/2007 | Bearss et al. | 358/1.13 |
| 7,221,468 | B2 * | 5/2007 | Kobayashi | 358/1.15 |
| 2002/0186404 | A1 * | 12/2002 | Gragg | 358/1.15 |

FOREIGN PATENT DOCUMENTS

| | | |
|---|---|---|
| CN | 1139220 | 1/1997 |
| JP | 9-37000 | 2/1997 |

OTHER PUBLICATIONS

Japanese Office Action Issued Sep. 20, 2005.

* cited by examiner

*Primary Examiner* — King Poon
*Assistant Examiner* — Lawrence Wills
(74) *Attorney, Agent, or Firm* — Staas & Halsey LLP

(57) ABSTRACT

An image forming apparatus driven by a single processor. The image forming apparatus includes an engine mechanism to perform a printing operation with respect to print data, a video unit to convert the print data into an image data format readable by the engine mechanism, and an engine control unit to control the engine mechanism to perform the printing operation with the image data under the control of the video unit. The video unit includes a processor provided therein, and the video unit and the engine control unit are driven by the processor of the video unit. The engine control unit is directly connected with the processor through a system bus, and drives the engine mechanism in accordance with the control of the processor.

14 Claims, 4 Drawing Sheets

IMAGE FORMING DEVICE CAPABLE OF DRIVING WITH SINGLE PROCESSOR

CROSS-REFERENCE TO RELATED APPLICATIONS

This application claims the priority of Korean Patent Application No. 2002-43017, filed Jul. 22, 2002 and Korean Patent Application No. 2003-41252, filed Jun. 24, 2003, in the Korean Intellectual Property Office, the disclosures of which are incorporated herein by reference.

BACKGROUND OF THE INVENTION

1. Field of the Invention

The present invention relates to an image forming device, and more particularly, to an image forming device in which an engine control unit, which has a video unit to convert data into image data, and an engine mechanism to perform a data printing process, are driven with a single processor.

2. Description of the Related Art

Generally, an electrophotographic image forming device such as a laser printer, an LED printer, a facsimile, or a digital copier, performs a series of image forming processes to print image data from a computer or a scanner into a visual image on a printing medium such as a paper sheet. These image forming processes will be described in greater detail below with reference to FIG. 1.

FIG. 1 is a block diagram schematically showing a conventional laser printer. Referring to FIG. 1, the conventional laser printer includes a video unit 10 and an engine unit 30.

The video unit 10 includes an operation panel 11, a computer I/F unit 12, a memory unit 13, a video I/F unit 14, and a CPU 15. The operation panel 11 includes an input unit (not shown) having a plurality of keys to input commands, and a display unit (not shown) to display an operational status of the laser printer. The computer I/F unit 12 is connected between a host computer and the CPU 15 to interface an input/output signal. The memory unit 13 includes a ROM (not shown) to store a control program and various application programs to drive the video unit 10, and a RAM (not shown) to temporarily store various data input from the host computer. The video I/F unit 14 is connected between the CPU 15 and the engine unit 30 and interfaces the input/output signal. The CPU 15 controls the overall operation of the video unit 10 in accordance with the control program stored in the memory unit 13. Data, control and address busses connect the memory unit 13 and the CPU 15.

The CPU 15 generates a display list to generate frame data from the data transmitted from the host computer via the computer I/F unit 12, color corrects to YMCK (yellow, magenta, cyan, black) color format and stores the color corrected data in the memory unit 13. The CPU 15 generates the data stored in the memory unit 13 into frame data of bitmap format of respective colors, and transmits the generated data to the engine unit 30 through the video I/F unit 14.

The engine unit 30 includes a CPU 31 to control driving of an engine mechanism 40 under the control of the video unit 10, and a memory unit 33 having a ROM (not shown) to store various control programs and a RAM (not shown) to temporarily store data from the execution of the programs by the CPU 31. Data, control and address busses connect the memory unit 33 and the CPU 31. The engine unit 30 further includes an engine I/F unit 32 connected between the video I/F unit 14 and the CPU 31 to interface the input/output signal, and an engine mechanism 40 to perform printing processes under the control of the CPU 31. The engine mechanism 40 includes a paper feeding unit 41, a laser scanning unit (LSU) driving unit 42, an LSU 42*a*, a developing unit 43, a transfer unit 44, a fusing unit 45 and a sensing unit 46.

Describing the controlling of the CPU 31 in detail, first, as a printing start command is received from the video unit 10 through the engine I/F unit 32, the CPU 31 controls the paper feeding unit 41 so that a sheet of printing paper is picked up. When the picked up paper sheet is determined to have reached a predetermined reference position as a result of sensing by the sensing unit 46, the CPU 31 transmits a page synchronization (Psync) signal to the video unit 10 through the engine I/F unit 32, to thus notify that the printing is started. Accordingly, as bitmap data is received from the video unit 10 in response to the Psync signal, the CPU 31 controls the engine mechanism 40 so that the printing with respect to the received bitmap data is performed.

As described above, the conventional laser beam printer has a separate video unit 10 and engine unit 30, and thus requires separate CPUs 15 and 31. This results in a complicated system, thus it is not easy to diagnose or recover the system in the event of error. Further, the I/F units 14 and 32 are also required to interface between the video unit 10 and the engine unit 30.

In order to construct the I/F units 14 and 32, various physical channels are required such as a command bus, an address bus, a status information bus, a data bus and a control bus, each including plural bits. In this case, because a plural number of pins among the pins of the respective CPUs 15 and 31 are used for the construction of the I/F units 14 and 32, usually, a serial bus such as a serial input/output (SIO), or the universal asynchronous receiver/transmitter (UART) is used. However, with the serial bus, the data transmission rate is slower than when using the parallel bus, and thus it is inefficient for the high speed data transmission.

Further, because a plural number of I/O ports, connectors and harnesses are required to construct the interface, the material costs increase, subsequently increasing the manufacturing costs.

SUMMARY OF THE INVENTION

Accordingly, it is an aspect of the present invention to provide an image forming device in which a single processor serves both the video unit and the engine unit. Thus, manufacturing costs are reduced because the need for interfaces is eliminated.

Additional aspects and advantages of the invention will be set forth in part in the description which follows and, in part, will be obvious from the description, or may be learned by practice of the invention.

The foregoing and/or other aspects of the present invention may be achieved by providing an image forming apparatus including an engine mechanism to perform a printing operation with respect to print data; a video unit to convert the print data into image data readable by the engine mechanism; and an engine control unit to control the engine mechanism to perform the printing operation with the image data in accordance with control by the video unit, wherein, the video unit includes a processor, and the video unit and the engine control unit are driven by the processor.

The engine control unit is directly connected with the processor through a system bus, and drives the engine mechanism in accordance with the control of the processor. The system bus includes a data bus, an address bus and a control bus, and the data bus is a bi-directional parallel bus. The engine control unit is an application specific integrated circuit (ASIC), and includes a memory to store state information about the engine mechanism.

The processor reads the state information stored in the memory to check the state of the engine mechanism, and transmits the image data to the engine control unit to perform the printing operation.

The foregoing and/or other aspects of the present invention may also be achieved by providing an image forming apparatus including an engine mechanism to perform a printing operation with respect to print data; a video unit to convert the print data into image data readable by the engine mechanism; an engine control unit to control the engine mechanism to perform the printing operation with respect to the image data in accordance with control by the video unit; a bi-directional parallel bus to directly connect the video unit and the engine control unit; and a single processor to drive the video unit and the engine control unit.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
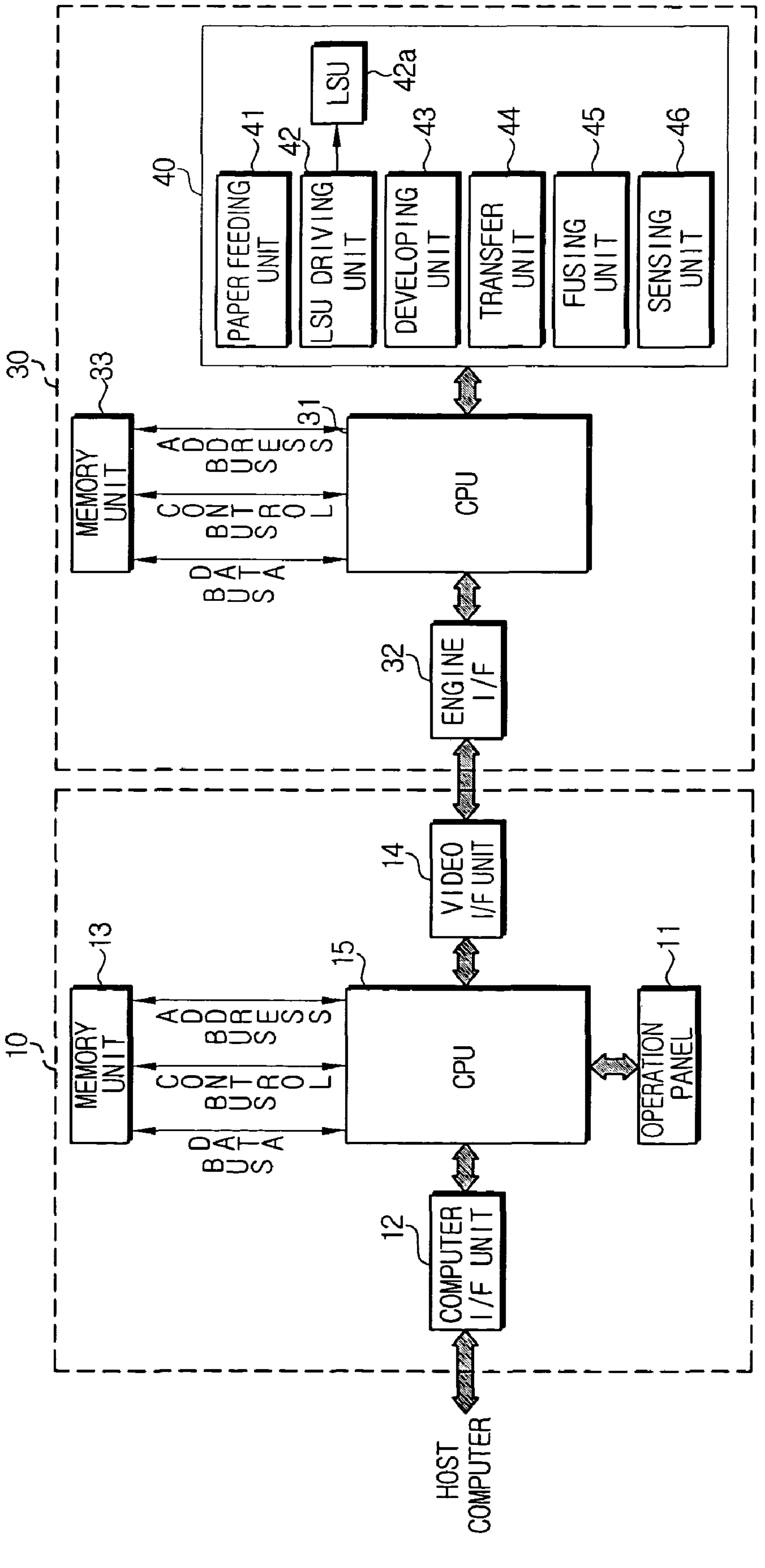
FIG. 1 (PRIOR ART)
FIG. 1 is a block diagram schematically showing a conventional laser printer.
Figure 2:
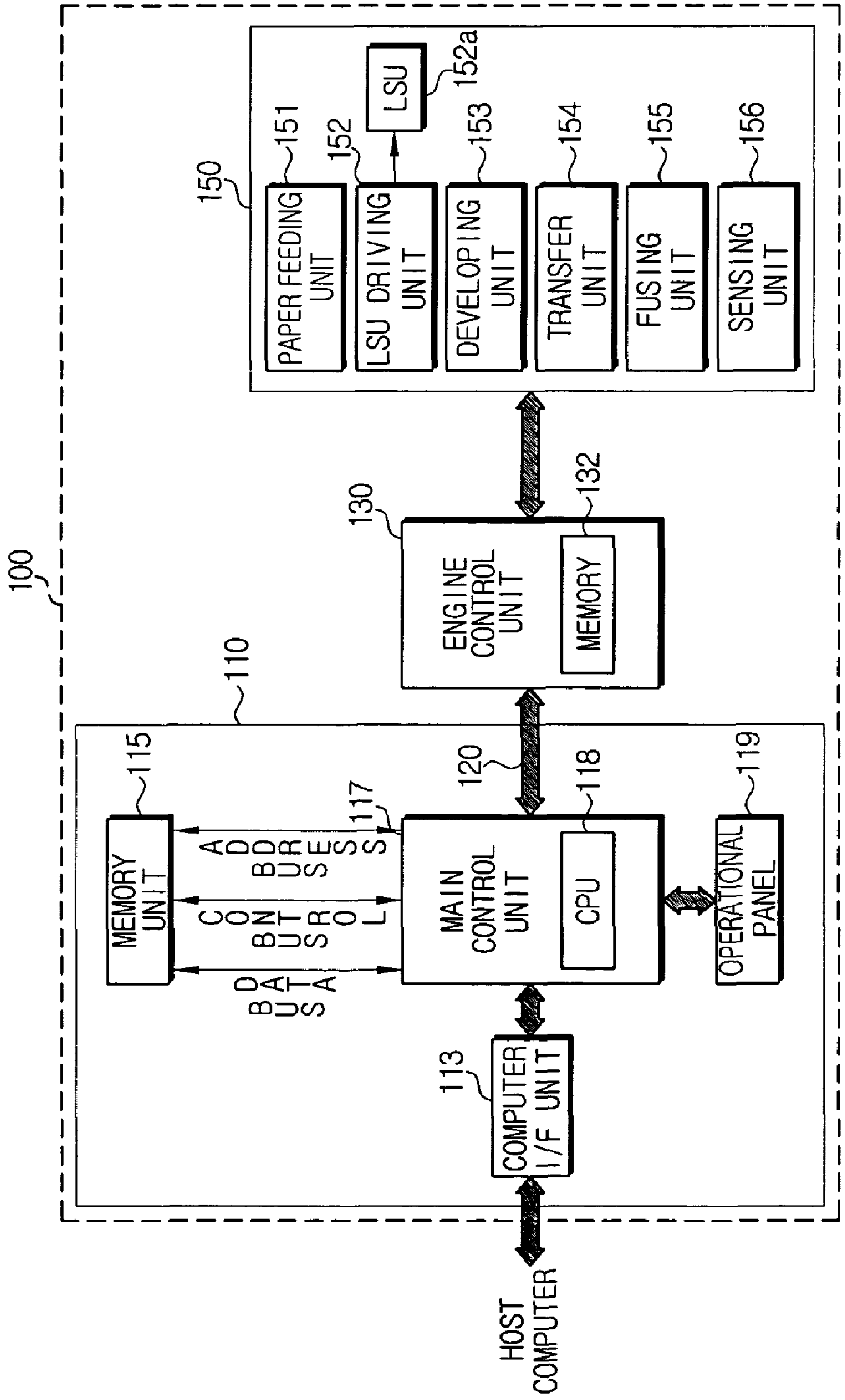
FIG. 2 is a block diagram showing a laser printer according to an embodiment of the present invention.

FIG. 2 is a block diagram illustrating a laser printer 100 according to an embodiment of the present invention. Referring to FIG. 2, the laser printer 100 includes a video unit 110 and an engine control unit 130. The video unit 110 converts print data input from an external device such as a host computer into bitmap image data. Under the control of the video unit 110, the engine control unit 130 controls the driving of an engine mechanism 150 to perform the printing operation with respect to the image data.

According to the embodiment of the present invention, both the video unit 110 and the engine control unit 130 are driven by a single processor, and the single processor is a microprocessor CPU 118 which supports a multi-operating system (OS) and belongs to a main control unit 117. Accordingly, the video unit 110 and the engine control unit 130 are arranged on a single printed circuit board (PCB).

The engine control unit 130 is applied as an application specific integrated circuit (ASIC), and has a memory 132 to store the information on the operational state of the engine mechanism 150. The engine control unit 130 simply controls the driving of the engine mechanism 150 in accordance with the control by the main control unit 117.

The engine control unit 130 is directly connected with the CPU 118 via a system bus 120. The system bus 120 is constructed of an address bus, a control bus and a data bus (not shown), and as for the data bus, a parallel bus may be applied. Meanwhile, the video unit 110 includes an operation panel 119, a computer I/F unit 113, a memory unit 115 and the main control unit 117. The operation panel 119 includes an input unit (not shown) having a plurality of keys through which functions supported by the laser printer 100 are selected and confirmed, and a display unit to display information about the operational state of the laser printer 100 in accordance with the control by the main control unit 117.

The computer I/F unit 113 is connected between the host computer and the main control unit 117 to interface an input/output signal. The computer I/F unit 113 may be IEEE1284, USB and RS232C interfaces.

The memory unit 115 includes a ROM (not shown) to store a control program and various application programs to drive the main control unit 117, and a RAM (not shown) to temporarily store print data from the host computer and the other various data which are generated during the program execution by the main control unit 117.

The main control unit 117 is integrated into a single chip together with the CPU 118, which controls the operation of the video unit 110 and the engine mechanism 150 in accordance with the control program stored in the memory unit 115. The main control unit 117 generates a display list for the generation of the frame data, when it receives the print data from the host computer via the computer I/F unit 113. The main control unit 117 color-corrects the data in YMCK color format and stores the corrected data in the memory unit 115, and then generates bitmap image data for each of the colors with the data stored in the memory unit 115. Upon completion of the bitmap data generation, the main control unit 117 transmits a print start command to the engine control unit 130.

The main control unit 117 perceives the engine control unit 130 as a device to control, and reads/writes predetermined data with respect to the engine control unit 130 via the system bus 120. For example, when the main control unit 117 reads predetermined data from the engine control unit 130, the main control unit 117 reads the status information which is stored in the memory 132 of the engine control unit 130 regarding the engine mechanism 150. When the main control unit 117 writes the data, the main control unit 117 writes command information on the engine control unit 130.

The engine control unit 130 is formed as an ASIC, and controls the driving of the engine mechanism 150 in accordance with the control of the main control unit 117. The engine control unit 130 receives image data from the main control unit 117 through the video data transmission line, and receives serial image data by being synchronized to the horizontal synchronization (Hsync) signal which is output from the LSU **152*a*** forming an electrostatic latent image.

The engine mechanism 150 includes a paper feeding unit 151, a laser scanning unit (LSU) **152*a*, an LSU driving unit 152, a developing unit 153, a transfer unit 154, a fusing unit 155, and a sensor unit 156**.

The paper feeding unit 151 picks up paper from a paper feeding cassette (not shown) sheet by sheet in accordance with the paper feed control signal of the engine control unit 130. The LSU **152*a* forms a predetermined electrostatic latent image on a photosensitive drum by emitting a laser beam in accordance with the image data. The developing unit 153 develops the electrostatic latent image by feeding developer thereto, and the transfer unit 154 transfers the developed image onto the fed sheet. The fusing unit 155** fixes the transferred image onto the paper with heat and pressure.

Figure 3:
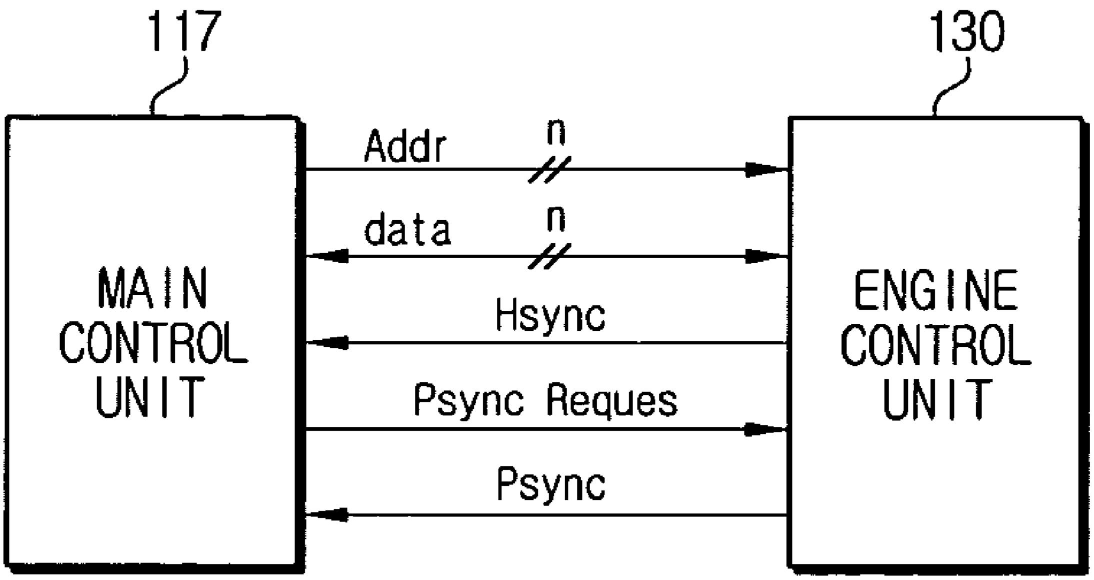
FIG. 3 is a view illustrating a signal flow between the main control unit and the engine control unit of FIG. 2.

FIG. 3 is a view illustrating the flow of signals between the main control unit 117 and the engine control unit 130 shown in FIG. 2.

Referring to FIG. 3, the main control unit 117 and the engine control unit 130 interface input/output signals through an address (addr) bus of n-bits, a bi-directional data (data) bus of n-bits, and a control bus which inputs and outputs a horizontal synchronization (Hsync) signal, a page synchronization signal request (Psync Request) signal and a page synchronization (Psync) signal.

The Hsync signal is a beam start synchronous signal output from the LSU 152*a*, and the Psync Request signal is a request signal to the engine control unit 130 in response to the Hsync signal received from the engine control unit 130. The Psync signal indicates that the paper picked up by the paper feeding unit 151 has reached a predetermined reference position. Upon determining through the engine control unit 130 that the picked up paper has reached the predetermined reference position, the main control unit 117 transmits bitmap image data to the engine control unit 130.

Figure 4:
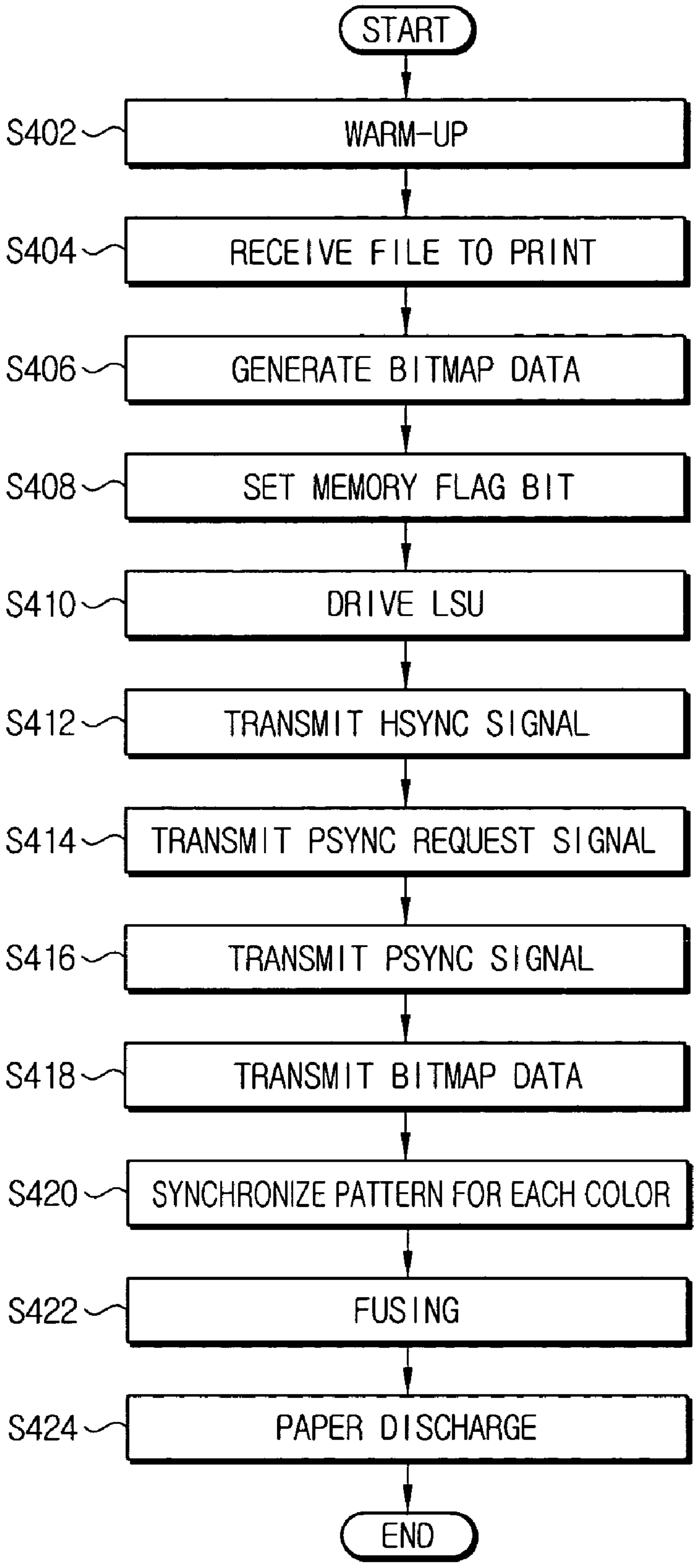
FIG. 4 is a flowchart illustrating the printing operation of the laser printer of FIG. 2.

The printing operation of the laser beam printer according to the embodiment of the present invention will be described below with reference to FIG. 4.

First, as the laser printer 100 is powered on, the main control unit 117 controls the engine control unit 130 so that a heater (not shown) is driven to warm up the fusing unit 155 (S402).

When a print start command and a file to print are received from the host computer via the computer I/F unit 113 (S404), the main control unit 117 determines which type of emulation that the file to print is in between the postscript and the print command language (PCL), and accordingly generates the display list code for bitmap data by driving a corresponding interpreter.

The main control unit 117 omits color processing if the print data is color data in YMCK format, while performing color correction into YMCK format if the print data is color data in a CIE or RGB format.

The main control unit 117 generates bitmap data using the display list generated by the interpreter (S406). The bitmap data are divided according to colors and stored in the memory unit 115. When the generation of the bitmap data is completed, the main control unit 117 sets a flag bit to the engine control unit 130 which is directly connected with the main control unit 117 via the system bus 120, notifying that the bitmap data generation is complete (S408).

The engine control unit 130 drives the LSU 152*a* if there is a set memory flag bit received from the main control unit 117 (S410). Then the engine control unit 130 receives the Hsync signal from the LSU 152*a* and transmits the received Hsync signal to the main control unit 117 (S412).

When the Hsync signal is received from the engine control unit 130 and when it is determined that the RPM of the motor of the LSU 152*a* has reached a predetermined value, the main control unit 117 sets a memory flag bit for the Psync Request signal to the engine control unit 130 (S414). When the Psync Request signal is received from the main control unit 117, the engine control unit 130 controls the paper feeding unit 151 to pick up the paper from the paper feeding cassette (not shown) and further controls the picked up paper sheet to be conveyed to a predetermined reference position. When it is determined that the paper has reached the predetermined reference position as a result of sensing by the sensing unit 156, the engine control unit 130 transmits the Psync signal to the main control unit (S416).

When the Psync signal is received from the engine control unit 130, the main control unit 117 transmits the bitmap data stored in the memory unit 115 to the engine control unit 130 (S418).

The engine control unit 130 pattern-synchronizes the Psync signal with the sync signal to adjust an end margin of the paper with respect to each of the YMCK colors. The engine control unit 130 further senses a start sync position scanned by a beam sensor to sense a beam start position in the LSU 152*a*, and pattern-synchronizes the beam start position with the sync signal to adjust a left side margin of the paper with respect to each of the YMCK colors (S420).

The LSU 152*a* emits a laser beam onto a photosensitive drum in accordance with the image data received from the engine control unit 130 and under the control of the LSU driving unit 152. Accordingly, an electrostatic latent image is formed on the surface of the photosensitive drum, and the formed electrostatic latent image is developed by four color, i.e., YMCK, developers of the developing unit 153. The developed image is transferred by the transfer unit 154 onto the fed paper, and the transferred image is fused to the paper with heat and pressure (S422). Finally, the printed paper is discharged through a paper discharging unit (S424).

As described above, in the image forming apparatus according to the present embodiment, because the video unit 110 and the engine control unit 130 are driven by a single processor, there is no need for an interface to connect the video unit 110 and the engine control unit 130. As a result, costs for constructing an interface are eliminated, and the manufacturing costs of the image forming apparatus are subsequently reduced.

Further, by driving the image forming apparatus with a single processor, the system design is simpler, and thus it is easier to diagnose or recover the system in the event of error, while it is also easy to embody the firmware for system control.

Furthermore, because the video unit 110 and the engine control unit 130 are connected through a bi-directional parallel data bus, control time for the engine control unit 130 is shortened compared to the conventional image forming apparatus, and accordingly, the main control unit 117 can have more time for the image data processing. As a result, high-speed image data processing and printing is enabled.

Although a few embodiments of the present invention have been shown and described, it will be appreciated by those skilled in the art that changes may be made in these embodiments without departing from the principles and spirit of the invention, the scope of which is defined in the claims and their equivalents.

What is claimed is:

1. An image forming apparatus comprising:

an engine mechanism to perform a printing operation with respect to print data, the engine mechanism including a paper feeding unit to pick up paper from a paper feeding cassette sheet by sheet in accordance with a paper feed control signal, a laser scanning unit to form an electrostatic latent image on a photosensitive drum by emitting a laser beam in accordance with image data, a developing unit to develop an electrostatic latent image by feeding a developer on the photosensitive drum, a transfer unit to transfer the developed image onto a fed sheet and a fusing unit to fuse the transferred image onto the paper with heat and pressure;

a video unit including a first memory and a microprocessor to execute software instructions to generate image data based on the print data and to store the image data in the first memory;

an engine control unit embodied as an application specific integrated circuit (ASIC) chip configured to receive operation state information relating to operational states of the engine mechanism, the engine control unit including a second memory to store the operation state information received from the engine mechanism; and a bi-directional parallel bus provided between the engine control unit and the microprocessor of the video unit, wherein the microprocessor of the video unit generates and transmits instruction commands to the ASIC chip of the engine control unit, the engine control unit drives the engine mechanism, including the paper feeding unit, the laser scanning unit, the developing unit, the transfer unit and the fusing unit, according to the image data and the instruction commands generated and transmitted by the microprocessor of the video unit, the video unit and the engine control unit are arranged on a single printed circuit board (PCB), and the ASIC chip of the engine control unit does not employ an internal processor.

2. The image forming apparatus of claim 1, wherein the microprocessor generates instruction commands based on operation state information read from the memory of the engine control unit.

3. The image forming apparatus of claim 1, wherein the bi-directional bus between the engine control unit and the microprocessor of the video unit is arranged to provide direct connection between the engine control unit and the microprocessor.

4. The image forming apparatus of claim 3, wherein the bi-directional bus comprises a control bus to input and output a horizontal synchronization (HSYNC) signal, a page synchronization signal request signal and a page synchronization (PSYNC) signal.

5. A method comprising:

executing, by a video unit including a first memory and a microprocessor, software instructions, generating image data based on print data and storing the image data in the first memory; and connecting the video unit and an engine control unit which receives operation state information relating to operational states of an engine mechanism, the engine control unit including a second memory to store the operation state information received from the engine mechanism, the connecting comprising connecting with a bi-directional bus which is provided between the engine control unit and the microprocessor of the video unit, wherein the engine mechanism includes a paper feeding unit to pick up paper from a paper feeding cassette sheet by sheet in accordance with a paper feed control signal, a laser scanning unit to form an electrostatic latent image on a photosensitive drum by emitting a laser beam in accordance with image data, a developing unit to develop an electrostatic latent image by a feeding developer on the photosensitive drum, a transfer unit to transfer the developed image onto a fed sheet and a fusing unit to fuse the transferred image onto the paper with heat and pressure, the engine control unit embodies an application specific integrated circuit (ASIC) chip and drives the engine mechanism, including the paper feeding unit, the laser scanning unit, the developing unit, the transfer unit and the fusing unit, according to the image data and the instruction commands generated and transmitted by the microprocessor of the video unit, the microprocessor of the video unit generates and transmits instruction commands to the ASIC chip of the engine control unit in parallel through a bi-directional parallel bus provided between the engine control unit and the microprocessor of the video unit, the video unit and the engine control unit are arranged on a single printed circuit board (PCB), and the ASIC chip of the engine control unit does not employ an internal processor.

6. The method of claim 5, further comprising:

performing, by the engine mechanism, a printing operation with respect to print data.

7. The method of claim 5, wherein the microprocessor generates instruction commands based on operation state information read from the memory of the engine control unit.

8. The method of claim 5, wherein the bi-directional bus between the engine control unit and the microprocessor of the video unit is arranged to provide direct connection between the engine control unit and the microprocessor.

9. The method of claim 8, wherein the bi-directional bus comprises a control bus to input and output a horizontal synchronization (HSYNC) signal, a page synchronization signal request signal and a page synchronization (PSYNC) signal.

10. An image forming apparatus comprising:

an engine mechanism to perform a printing operation with respect to print data, the engine mechanism including a paper feeding unit to pick up paper from a paper feeding cassette sheet by sheet in accordance with a paper feed control signal, a laser scanning unit to form an electrostatic latent image on a photosensitive drum by emitting a laser beam in accordance with image data, a developing unit to develop electrostatic latent image by feeding developer on the photosensitive drum, a transfer unit to transfer the developed image onto a fed sheet and a fusing unit to fuse the transferred image onto the paper with heat and pressure;

a video unit including a first memory and a microprocessor to execute software instructions to generate image data based on the print data and to store the image data in the first memory;

an engine control unit embodied as an application specific integrated circuit (ASIC) chip configured to receive operation state information relating to operational states of the engine mechanism, the engine control unit including a second memory to store the operation state information received from the engine mechanism; and a bi-directional parallel bus provided between the engine control unit and the microprocessor of the video unit, wherein the microprocessor of the video unit generates and transmits instruction commands to the ASCI chip of the engine control unit, the engine control unit drives the engine mechanism, including the paper feeding unit, the laser scanning unit, the developing unit, the transfer unit and the fusing unit, according to the image data and the instruction commands generated and transmitted by the microprocessor of the video unit, the ASIC chip of the engine control unit does not employ an internal processor.

11. The image forming apparatus of claim 10, wherein the video unit and the engine control unit are arranged on a single printed circuit board.

12. The image forming apparatus of claim 11, wherein the microprocessor generates instruction commands based on operation state information read from the memory of the engine control unit.

13. The image forming apparatus of claim 11, wherein the bi-directional bus between the engine control unit and the processor of the video unit is arranged to provide direct connection between the engine control unit and the processor.

14. The image forming apparatus of claim 13, wherein the bi-directional bus comprises a control bus to input and output a horizontal synchronization (HSYNC) signal, a page synchronization signal request signal and a page synchronization (PSYNC) signal.

* * * * *

UNITED STATES PATENT AND TRADEMARK OFFICE

CERTIFICATE OF CORRECTION

PATENT NO. : 8,159,696 B2
APPLICATION NO. : 10/623586
DATED : April 17, 2012
INVENTOR(S) : Yoon-seop Eom et al.

It is certified that error appears in the above-identified patent and that said Letters Patent is hereby corrected as shown below:

Column 8, Line 40, In Claim 10, delete “ASCI” and insert -- ASIC --, therefor.

Signed and Sealed this
Third Day of July, 2012

David J. Kappos
*Director of the United States Patent and Trademark Office*